United States Patent [19]

Dively et al.

[11] Patent Number: 4,980,887
[45] Date of Patent: Dec. 25, 1990

[54] DIGITAL COMMUNICATION APPARATUS AND METHOD

[75] Inventors: Lee V. Dively; Donald R. Casady, both of Tulsa, Okla.

[73] Assignee: Seiscor Technologies, Tulsa, Okla.

[21] Appl. No.: 263,170

[22] Filed: Oct. 27, 1988

[51] Int. Cl.$^5$ .......................... G01R 31/28; H04B 3/46
[52] U.S. Cl. .................................. 371/20.2; 370/13.1; 371/20.5; 379/4
[58] Field of Search .................... 371/20.2, 20.5, 20.6; 370/13.1, 15; 379/4, 5

[56] References Cited

U.S. PATENT DOCUMENTS

| | | | |
|---|---|---|---|
| 3,909,563 | 9/1975 | Ghosh et al. | 371/20.2 |
| 4,006,456 | 2/1977 | Wilk | 371/20.2 |
| 4,069,402 | 1/1978 | Mantovani et al. | 370/13.1 |
| 4,112,263 | 9/1978 | Lender | 371/20.2 |
| 4,112,414 | 9/1978 | Iscol et al. | 371/20.5 |
| 4,425,662 | 1/1984 | Jeandot | 371/20.2 |
| 4,564,933 | 1/1986 | Hirst | 371/20.2 |
| 4,630,268 | 12/1986 | Rodenbaugh | 371/20.5 |
| 4,675,862 | 6/1987 | Banzi, Jr. et al. | 371/20.2 |
| 4,766,594 | 8/1988 | Ogawa et al. | 371/20.2 |

OTHER PUBLICATIONS

"DS-1 Interface Connector; TA-TSY-000312; Issue 2, Oct. 1986; Bell Communications Research".

Primary Examiner—Charles E. Atkinson
Attorney, Agent, or Firm—William R. Clark; Richard M. Sharkansky

[57] ABSTRACT

A T1 digital carrier system having a transmitter, receiver and a plurality of intermediate repeater stages. Each remote repeater has a select switch for automatically selecting that the remote repeater be placed in loop-back mode should a combination of framing bits occur in the serial bit stream that matches that said remote repeaters address therein, thereby allowing remote testing of the communications link and repeaters. In addition, no additional test lines are required to verify a T1 communications link.

20 Claims, 8 Drawing Sheets

DIGITAL COMMUNICATION APPARATUS AND METHOD

Background of the Invention

This invention relates generally to digital communication apparatus and methods and more particularly to digital communication apparatus and methods for testing repeaters used in such apparatus.

As is known in the art, a communications system generally includes a central office (master terminal), remote office (remote terminal), and one or more repeaters disposed between the central office and the remote office to regenerate signals passing therethrough and to thereby extend the transmission distance between the offices. Typically, the distance between a pair of repeaters is about one mile while the distance between the central and remote offices is typically 10 to 12 miles.

As is also known in the art, one type of digital communication system is a T1 communication system. A typical T1 system has a pair of transmit lines through which the master terminal transmits information to the remote terminal and a pair of receive lines by which the remote terminal transmits to the master terminal. A T1 system also has an additional pair of test wires that parallel the transmit/receive lines. The purpose of the test wires will be explained later. Suffice it to say here, however, that with such a system, information is transmitted as a series of superframes. Each superframe is made up of 12 frames, $F_1-F_{12}$ as shown in FIG. 1. (Each frame has a time duration of 125 microseconds). Each one of the frames $F_1-F_{12}$ in turn is made up of 24 time slots or channels, $C_1-C_{24}$. Each time slot $C_1-C_{24}$ has up to 8 bits of data or voice information, as shown for exemplary time slot $C_2$ as $C_2b_1-C_2b_8$. Each one of the frames, $F_1-F_{12}$, also includes a framing bit $FB_1-FB_{12}$, respectively, as shown in FIG. 2. Thus, exemplary frame $F_2$ is shown to have a framing bit $FB_2$ as shown in FIGS. 1 and 2. Thus, each one of the 12 frames $F_1-F_{12}$ is made up of 193 bits; 192 bits of data or voice information and one framing bit. The framing bits $FB_1-FB_{12}$ are used for synchronization at a receiver located at a remote terminal. More particularly, the 12 framing bits $FB_1-FB_{12}$ transmitted in each superframe for a standard T1 system make up a predetermined 12 bit binary word or sychronization pattern. The order of the sequence of the framing bits $FB_1-FB_{12}$ in a standard T1 system which forms the synchronization pattern is as follows: For the odd numbered framing bits $FB_1$, $FB_3$, $FB_5$, $FB_7$, $FB_9$, the sequence is alternating 1, 0, 1, 0, 1, 0, respectively. For the even numbered framing bits $FB_2$, $FB_4$, $FB_6$, $FB_8$, $FB_{10}$, $FB_{12}$, the sequence of framing bits is 0, 0, 1, 1, 1, 0, respectively. When the receiver detects this 12 bit synchronization pattern, the receiver is placed in synchronization with each superframe.

As is also known, some T1 systems use an extended superframe, frame, as shown in FIG. 3. Each extended superframe is made up of 24 frames, $EF_1-EF_{24}$, each one of the frames $EF_1-EF_{24}$ is made up of 24 time slots or channels and a framing bit. Each time slot has up to 8 bits of data or voice information. Thus, each one of the frames $EF_1-EF_{24}$ in an extended superframe includes 192 bits of data or voice information and one framing bit, $EFB_1-EFB_{24}$. The 12 framing bits in the even numbered frames in each extended superframe, i.e. $ESF_NFB_2$, $ESF_NFB_4$, $ESF_NFB_6...ESF_NFB_{24}$ make up a predetermined 12 bit binary word or synchronization pattern of an extended standard superframe with the following exceptions: First, an extended superframe contains 24 frames $EF_1-EF_{24}$, and second, the sequence of even numbered framing bits $ESF_NFB_2$, $ESF_NFB_4$, $ESF_NFB_6...ESF_NFB_{24}$ provide a 12 bit binary word or synchronization pattern and thus provide an equivalent function as the total 12 framing bits $FB_1-FB_{12}$ as in the standard T1 system as shown in FIG. 2. Thus, the sequence for framing bits $ESF_NFB_4$, $ESF_NFB_8$, $ESF_NFB_{12}$, $ESF_NFB_{16}$, $ESF_NFB_{20}$, $ESF_NFB_{24}$ will be 0, 0, 1, 0, 1, 1. When the receiver detects this 6 bit word or pattern, the receiver is placed in synchronization with each extended superframe.

Thus, in a T1 system using data transmitted in either the standard superframe format or the extended superframe format, the receiver is interrogating sequence of framing bits to identify a pattern to enable synchronization of each superframe or extended superframe, respectively.

As further known, bipolar formatted data is transmitted at a fixed rate in a T1 system. That is, in a bipolar system, each time a logical 1 information bit is transmitted, the voltage polarity of the successive logic 1 information bit is reversed from the polarity of the preceding logic 1 information bit, as shown for a typical pattern of 0, 1, 1, 0, 0, 1, 0 in FIG. 4. A bipolar violation consists of a signal sent on the two consecutive pulses of the same polarity.

One technique used to test a selected one of 12 repeaters in a T1 system is a tone monitoring method using a test set disposed within the central office. As described in reference Rural Electrification Administration, Telecommunications Engineering & Construction Manual, Section 956, Vol. No. 1, Sept. 1982 (REA manual), a T1 system has only 12 variable bi-polar violation frequencies. Consequently, the tone monitoring method allows only a maximum of 12 repeaters to be tested, one repeater per violation frequency.

As further described in the REA manual, the test set consists of a pulse generator and a voice frequency selective voltmeter (receiver). The pulse generator output is connected to the transmit lines, and provides the transmit line driving signal. The test set receiver is connected to test wires; this is a voice frequency cable pair. The pulse generator output is 1.544 Mb/s line signal consisting of trios of pulses with a large quantity of bipolar violations. These are transmitted in specific patterns of positive trios (positive-negative-positive) and negative trios (negative-positive-negative) as illustrated by the brackets in FIGS. 4A and 4B. Thus, FIG. 4A illustrates one positive violation between a pair of trios followed by one negative violation between a pair of trios, while FIG. 4B shows three positive violations followed by three negative violations between four trios. The low frequency characteristics of these signals are contained in the rate by which the pattern alternates from positive trios to negative trios. If this signal is passed through a voice frequency filter within each repeater, the 1.544 Mb/s bit stream would be eliminated and a voice frequency signal would remain on the test wires.

For example, FIG. 4A shows a test pattern waveform having a fundamental frequency component $f_1$ and FIG. 4B shows a waveform having a fundamental frequency component $f_3$. Further, each one of the 12 repeaters has a narrowband filter tuned to a corresponding one of the 12 fundamental frequency components produceable with the 12 possible violation patterns. Thus, one repeater of the 12 repeaters is tuned to frequency $f_1$ and another is tuned to frequency $f_3$. The filter passes the fundamental frequency to an amplifier, and the amplified signal thus provides a test tone to the central office test set on the pair of test wires.

During test operation, the test set measures the test tone. When the test set measures the test tone and detects the proper frequency, the repeater under test is known to be correctly operating.

While the technique is useful in some applications, it has certain problems. First, a tuned filter must be installed in each repeater. The added filter increases repeater cost. Second, the coupled tone from each filter must be carried on an extra pair of test wires that parallel the transmit and receive lines. Extra wires add additional expense to the system. Third, the amplitude of the tone is attenuated through the cable. At long cable lengths, the tone is attenuated sufficiently to be highly susceptible to distortion, making it harder to be detected. This detection is more difficult with long cable lengths. Therefore, the further the repeater is from the test set, the lower the reliablility of a repeater test. Additionally, the tone is also susceptible to noise induced from the environment. This noise alters the characteristics of the tone by causing a faulty test tone having a large amount of noise riding on top of the test tone. A greatly noisy test tone received by the test set may make the test invalid.

As is also known in the art, in digital communication systems, a repeater can be tested by being placed in loop-back mode as described in U.S. Pat. Nos. 4,564,933 and 4,630,268. As described in U.S. Pat. No. 4,564,933, in response to a signal from a central office, a loop is established at a repeater, which returns signals sent on the "send" path back to the same station on the "receive" path. Thus, by looping back at various repeaters, the location of faults may be established. Such loopback may be used not only to establish, for example, cable breaks or serious faults in repeaters, but may preferably also be used to monitor remotely the quality of the system performance and thereby give early warning of system degradation. To use this method in a T1 system, however, requires imbedding a predetermined sequence of characters in a data stream to set the system to a loop-back condition with the concommitant disadvantage that an unwarranted user may be able to put the system into a loopback condition by inserting the predetermined sequence of characters into the data stream, or more likely, the system may be mistakenly or inadvertently placed in a "loop-back" condition if this predetermined sequence of characters occurs randomly in a data stream in normal operation.

A second method to set a repeater to a loop-back mode is described in U.S. Pat. No. 4,630,268. This method sets the repeater to a loop-back condition upon detecting a change in frequency of the transmission rate. This method is not however suitable for use in a T1 system because a T1 system requires that information be transmitted at a fixed transmission rate. Existing repeater and remote terminal equipments in a T1 system contain internal oscillators which are tuned to and synchronized at 1.544 MHz. When a T1 repeater or remote terminal receives data, it detects each information bit and regenerates the received information bit at a preset time and shape. If the information were transmitted at a different bit rate, the electronics within the repeater could not regenerate the information.

SUMMARY OF THE INVENTION

It is an object of the present invention to provide an improved communications system.

It is an object of the present invention to provide a communications system that allows loop-back of all test signals without the requirement for extra test lines.

It is another object of the invention to provide testing of the communications system without requiring a multifrequency test signal to operate in existing T1 communication systems.

It is an object of this invention to provide a T1 communications system that allows for testing of greater than 12 repeaters.

It is another object of the invention to provide testing of the communications system without the system inadvertently going into a loop-back condition.

In accordance with the present invention, a communications system is provided having a master terminal, a remote terminal, and at least one remote repeater, the master terminal transmitting along a transmit data path information serially through the repeater to the remote terminal and receiving along a receive data path information serially through the repeater from the remote terminal. The information comprises a plurality of successive frames, each frame having a framing bit. The communications system comprises a means disposed within the remote repeater and coupled to the transmit data path for receiving a plurality of the framing bits. A means is disposed within the remote repeater, for transferring information from the master terminal transmitted on the transmit data path back to the master terminal on the receive data path in response to a predetermined pattern of the received framing bits. With such arrangement, the available transmit receive lines may be used during the test mode. The system can be used to test a T1 system using the fixed T1 system data rate, and because the test pattern code placing the system in a loop-back mode is in the framing bits rather than in the data bits, inadvertent placement of a repeater in the test mode is eliminated.

Also provided is the method of testing a communication link as having respectively separated uni-directional transmit and receive paths, to localize communications link comprising a master terminal communicating to a remote terminal through one or more serial coupled remote repeaters interposed in and between the paths. The method is practiced by transmitting by the master terminal a plurality of frames of data in a T1 format serially to the remote terminal along the transmit path, the data frame comprises a plurality of data channels and a framing bit, the framing bits disposed within the frames of data combine to form a plurality of sync bits and a predetermined sequence. The next step is detecting the predetermined sequence of framing bits by the receiver section disposed within the remote repeater. Subsequently, changing the remote repeater to a loopback condition in response to the predetermined sequence of framing bits bearing a predetermined relationship to a reference pattern stored within the remote repeater. Further, transmitting test information from the master terminal along the transmit path through the link to the remote repeater and back to the master terminal along the receive path to verify the communications link is operational. Then transmitting a second plurality of frames of data in a T1 format from the master terminal through the remote repeater along the transmit path wherein the second plurality of frames of data contains a predetermined sequence of framing bits detecting the predetermined sequence of framing bits by the receiver section disposed within the remote repeater. Finally, changing the remote repeater to a reset condition in response to the predetermined sequence of framing bits bearing a predetermined relationship to a reference pattern stored within the remote repeater.

This invention allows the following features over the prior art. First, no additional pairs of test wires are required because there is no need to have an additional line to monitor a test signal. Second, the test signals are digital; therefore there is no degradation of the test signals due to extra cabling. Third, to test the system no frequency shifting of the digital signal is required. Data is transmitted at a fixed bit rate. Fourth, a large quantity of repeaters may be tested; the only limit to the number of repeaters to be tested is the number of digital bits encoded in a predetermined pattern which initiates or disconnects the loop-back. Fifth, the equipment initiating the predetermined pattern may be remotely located from the physical line and repeaters being tested. The invention allows greater than 27 lines or repeaters to be tested from a remote test site. Sixth, the predetermined pattern can be encoded in framing bits and, for all practical purposes, not accessible to the user, thereby preventing inadvertent loop-back of a repeater by the normal bit stream data.

BRIEF DESCRIPTION OF THE DRAWINGS

The foregoing features of this invention, as well as the invention itself, may be more fully understood from the following detailed description, read together with the accompanying drawings, in which.

DESCRIPTION OF THE PREFERRED EMBODIMENTS

The preferred embodiment of the invention as disclosed comprises a T1 digital communications system wherein a plurality of bi-directional, time division multiplexed information signals, each having a series of frames and predetermined number of binary digits per frame for transmission of voice and data services through repeaters between a central office and a remote terminal location are modified so that a repeater will loop back data to the source of the transmissions to test the communications system. Although a T1 system is discussed, the invention can be used in systems with faster bit rates such as T2, T3, CCITT ICM (2.048 MHz), etc.

Figure 5:
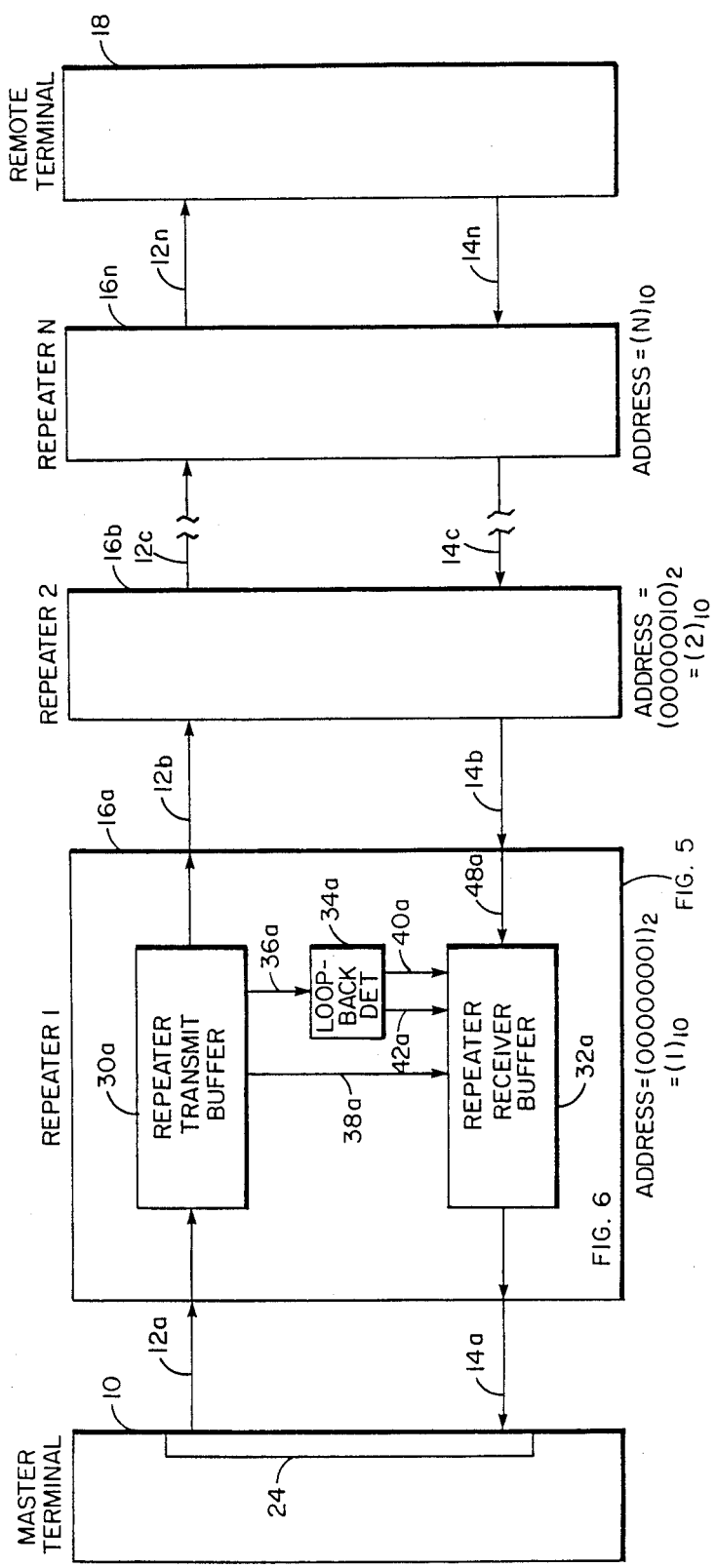
FIG. 5 is a system diagram of a communication system in accordance with the invention.

Referring to FIG. 5, a block diagram of a T1 communications system is shown. The communications system has a master terminal 10 serially connected through repeaters 16a–16n to remote terminal 18. Typically, the master terminal 10 is a central office or other location where the information signal originates. The remote terminal 18 is located close to customer sites. Disposed within or remotely connected to the master terminal 10 is a test set 24. The test set 24 is used when verifying the operation of the communications system in a manner to be described.

Figure 6:
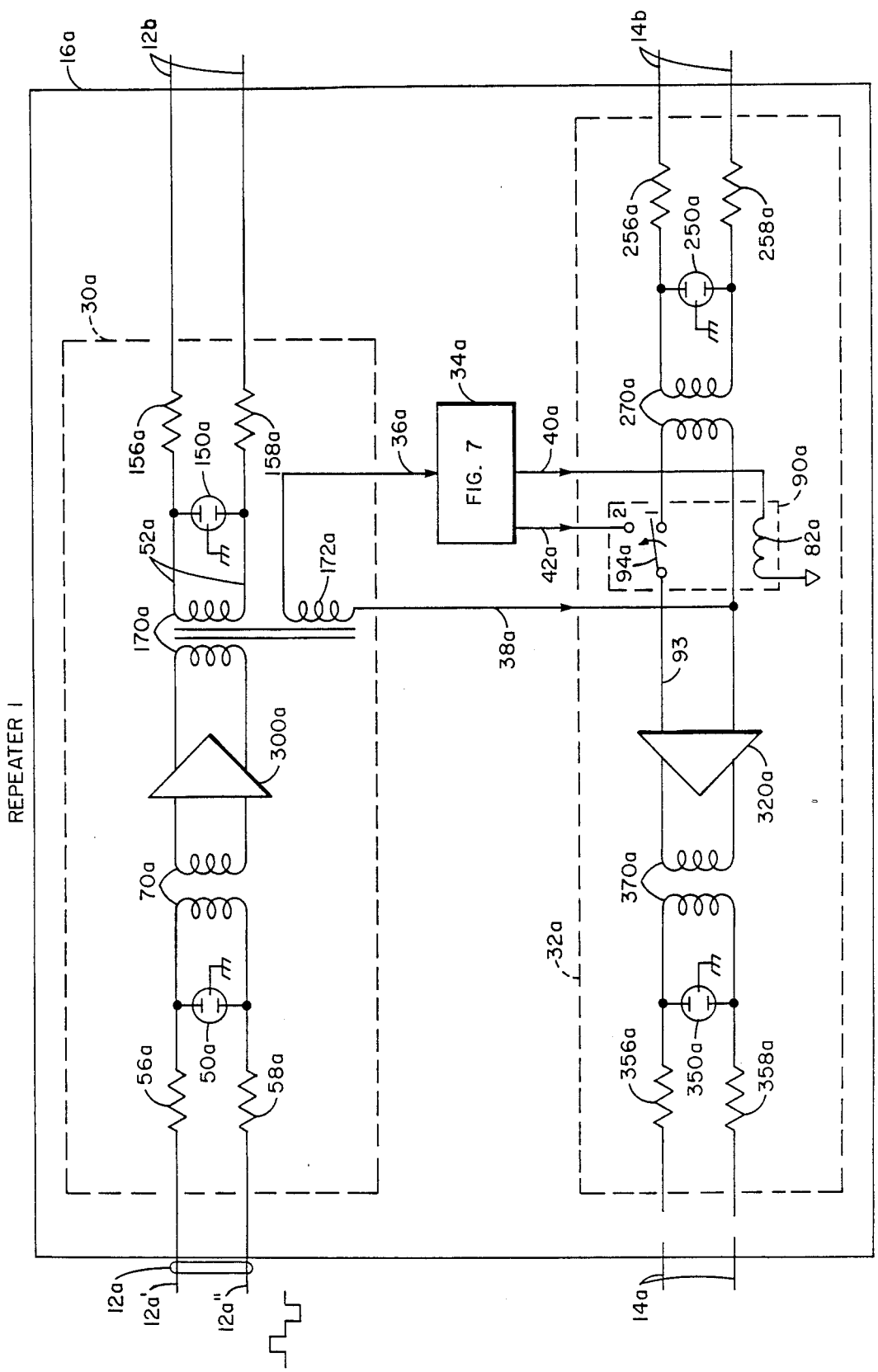
FIG. 6 is a block diagram of an Enhanced T1 repeater.

The master terminal 10 communicates with remote terminal 18 through a plurality of repeaters 16a–16n and a plurality of data lines (i.e. transmit data lines 12a–12n, respectively, and receive lines 14a–14n, respectively). Each data line, for example, data line 12a, has two wires, 12a' and 12a" as shown in FIG. 6. The span of data lines 12a–12n and data lines 14a–14n is nominally one mile. A typical distance between the master terminal 10 and the remote terminal 18 is ten to twelve miles. The voltage on one wire 12a' in a pair 12a always compliments the other wire 12a" in the pair 12.

The internal structure of each of repeaters 16a–16n between master terminal 10 and remote terminal 18 are identical. An exemplary one thereof, here repeater 16a, is shown in detail to include a repeater transmit buffer 30a, repeater receive buffer 32a and loop-back detector 34a. Repeater 16a also includes internal data line 36a, internal line 38a, loopback enable line 40a and internal data line 42a. Internal data line 36a connects repeater transmit buffer 30a to loopback detector 34a. Internal data line 38a connects repeater transmit buffer 30a to repeater receive buffer 32a. Loop-back enable line 40a and internal data line 42a connect loop-back detector 34a to repeater receive buffer 32a.

In normal operation, repeater transmit buffer 30a receives information from master terminal 10 via transmit data line 12a. Repeater transmit buffer 30a then regenerates the received information, and then retransmits the information on transmit data line 12b through repeaters 16b–16n to remote terminal 18. The remote terminal 18 receives information along transmit data line 12n and does the following: First, the remote terminal 18 stores the information. Second, upon storing information, the remote terminal 18 scans the stored information to detect the sync pattern disposed within framing bits $FB_1$–$FB_{12}$ or $ESF_NFB_2$, $ESF_NFB_4$,—..$ESF_NFB_{24}$. Third, upon detecting the sync pattern, the remote terminal 18 determines the beginning of the superframe. Finally, once the superframe beginning has been determined, the remote terminal 18 processes the information received on line 12n.

In normal operation, the remote terminal 18 transmits information to master terminal 10 through repeaters 16n–16a via data lines 14n–14a. Information transmitted by remote terminal 18, after leaving repeater 16b, enters repeater 16a via line 14b. In repeater 16a, the information is sent into repeater receive buffer 32a. Repeater receive buffer 32a regenerates the information, and then transmits it onto line 14a to master terminal 10.

In repeater 16a, loop-back detector 34a monitors and receives information on line 36a passing through repeater transmit buffer 30a. When loop-back detector 34a receives a predetermined sequence of information from consecutive sets of framing bits $SF_NFB_1$–$SF_NFB_{12}$ or $EF_2$, $EF_4$...$EF_{24}$, the loop-back detector 34a passes information on line 12a through repeater transmit buffer 30a to repeater receive buffer 32a via lines 38a, 42a. Repeater receive buffer 32a prevents the information on line 14b from going into repeater receive buffer 32a. The details of the loop-back detector 34a operation and the predetermined sequence of framing bits will be explained later in connection with FIG. 7.

When testing the communications link that uses a standard T1 superframe, a test set 24 is placed within the master terminal 10 or is located at a remote location and electrically connected to master terminal 10. The test set 24 is coupled to the transmit data line 12a and the receive data line 14a. Test set 24 sends information along the transmit data line 12a to repeaters 16a–16n. This information on line 12a contains a normal sequence of framing bits to assure that all loop-back detectors 34 (FIG. 6) establish T1 line sychronization. Upon initiation of the test, the test set 24 begins continuously transmitting a serial code or first sequence of framing bits $SF_1FB_1$, $SF_2FB_1$...$SF_{24}FB_1$ for a standard superframe $SF_N$ until the test set 24 receives the information it is transmitting. If a 24 bit code is to be sent, 24 superframes $SF_N$ must be transmitted to complete one transmission. The sequence of framing bits forms an exemplary 24 bit pattern that contains an 8-bit preamble, an 8-bit command word and an 8-bit address. By "stealing" only one of the 12 framing bits within each superframe, the equipment on the T1 line will continue to remain in sychronization. Repeaters 16a–16n receive the information on line 12a. The loop-back detector within repeater 16a examines framing bits $SF_1FB_1$, $SF_2FB_1$... $SF_{24}FB_1$. The loop-back detector 34a compares the first sequence of framing bits $SF_1FB_1$, $SF_2FB_1$...$SF_{24}FB_1$ to an internally stored reference word stored in the loop-back detector 34a. If the framing bits $SF_1FB_1$, $SF_2FB_1$...$SF_{24}FB_1$ matches the stored reference word, the repeater 16a will be set to a loop-back configuration.

The preamble is any 8-bit sequence preferably starting with 0, such as $(01011010)_2 = (5A)_{16} = 90_{10}$. The 8-bit message/command word is any 8-bit sequence preferably different from the preamble such as $(C3)_{16} = (11000011)_2$ to enter loop-back configuration and $(C5)_{16} = (110000101)_2$ to release loop-back configuration.

The preamble and message command word are optional in testing a repeater and are used to prevent the repeater from inadvertently entering loop-back configuration. However, the 8-bit address is used to select which remote repeater is to enter/release loop-back configuration. The 8-bit address for repeater 16a is here $(00000001)_2 = 1_{10}$. For repeater 16b, the address is $(00000010)_2 = 2_{10}$. It follows that the address for repeater 16c–16n are $(3)_{10}$–$(N)_{10}$, respectively.

In a loop-back configuration, information on line 12a is transmitted through repeater transmit buffer 30a, internal data line 36a and 38a, loop-back detector 34a, internal data line 42a, repeater receive buffer 32a and onto line 14a. This connection is accomplished by loop-back detector 34a asserting a positive voltage on loop-back enable line 40a. This assertion results in information on internal data line 42a being transferred into repeater receive buffer 32a and onto line 14a. While the repeater 16a is set to a loop-back configuration, the transmission of information on line 12a is returned via receive data line 14a. In addition, information transmitted from remote terminal 18 is open circuited in repeater 16a and is not transmitted to master terminal 10.

If, for example, repeater 16a is to be tested, the test set 24 will send a sequence of framing bits $SF_1FB_1$–$SF_{24}FB_1$ that have a preamble, an enter loop-back command and an address that forms pattern $(00000001)_2$. Information on line 12a will be received by repeater transmit buffer 30a within repeater 16a. Data is then transferred onto internal data line 36a and into loop-back detector 34a. Loop-back detector 34a then scans the received information to detect the data imbedded in the sequence of framing bits $SF_1FB_1$–$SF_{24}FB_1$. Loop-back detector 34a then compares the received sequence of framing bits $SF_{17}FB_1$–$SF_{24}FB_1$ $(00000001)_2$ with an internally prestored eight bit reference pattern or address. This internally pre-stored eight bit reference pattern is programmed into address switch 110a (FIG. 7) located within the repeater 16a. Each of the repeaters 16a–16n have a different address or pre-stored eight bit reference pattern (See FIG. 5 for an example of pre-stored eight bit reference patterns). Loop-back detector 34a will also compare the framing bits $SF_1FB_1$, $SF_2FB_1$,...$SF_{16}FB_1$ to an internally pre-stored preamble and command list. If the sequence of framing bits $SF_{17}FB_1$–$SF_{24}FB_1$ matches the pre-stored eight bit reference pattern $(00000001)_2$ and the preamble and command list framing bits $SF_1FB_1$, $SF_2FB_1$...$SF_{16}FB_1$ match the prestored preamble and command for loop-back $(9A)_{16}$, loop-back detector 34a then sets repeater 16a to a loop-back configuration.

Figure 1:
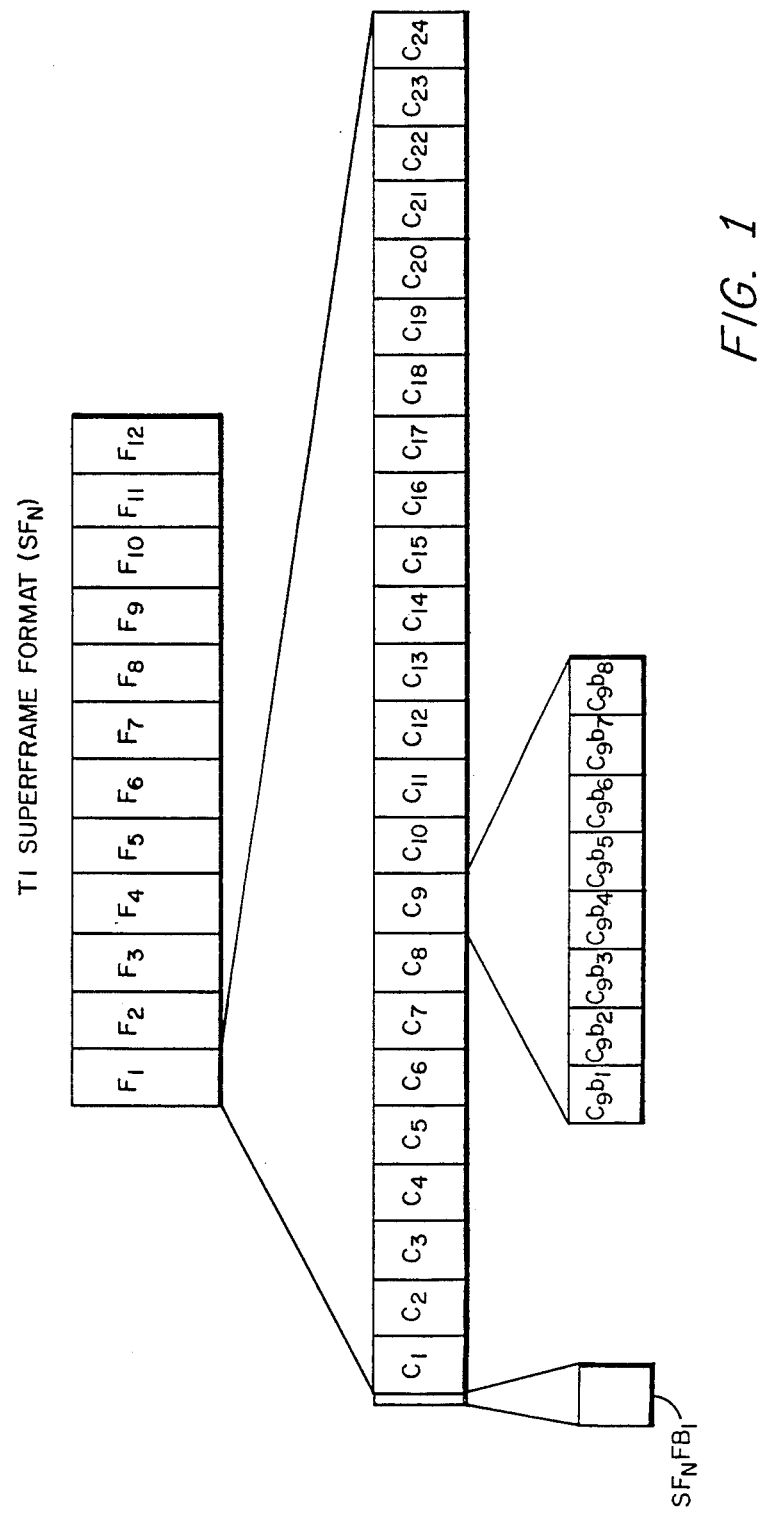
FIG. 1 is a diagram of the data and framing bits of a T1 superframe.
Figure 2:
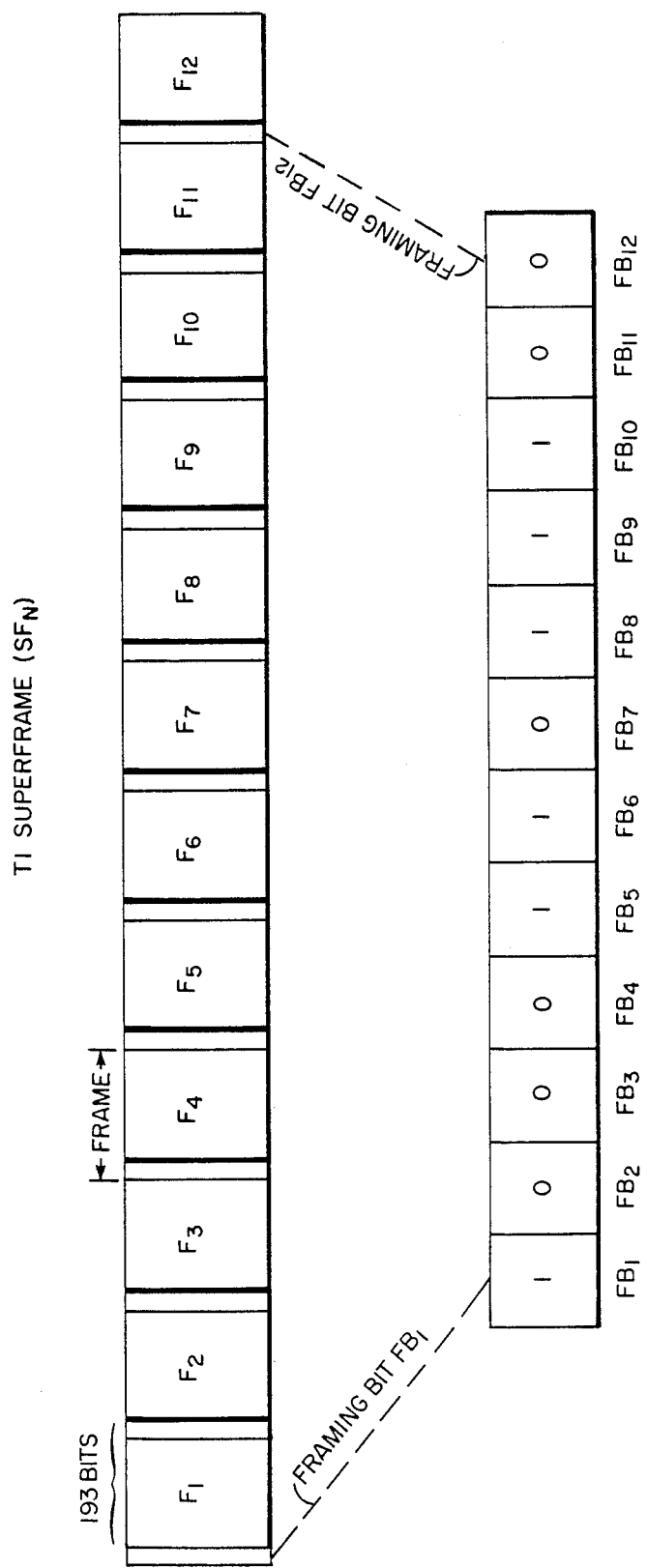
FIG. 2 is a diagram of the framing bits of a standard T1 superframe.
Figure 3:
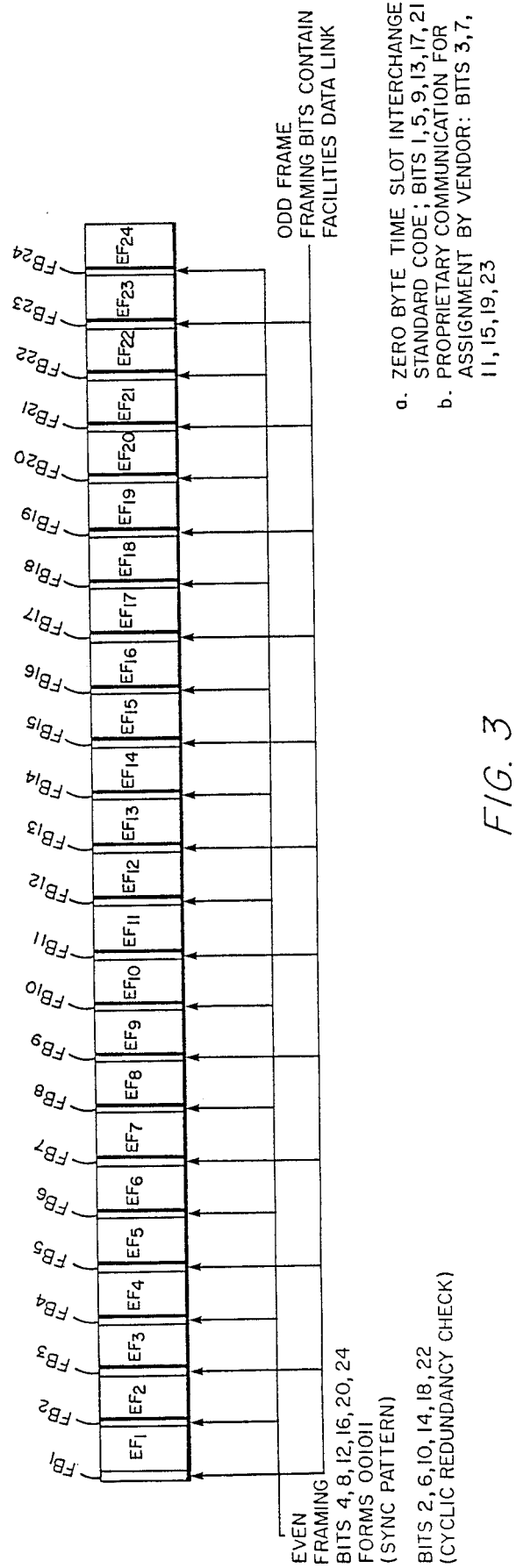
FIG. 3 is a diagram of an extended T1 superframe and its components.
Figure 4:
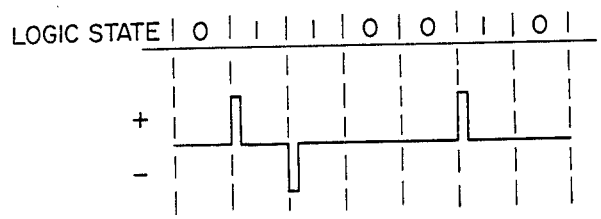
FIG. 4 is a seven bit T1 pulse stream without any bipolar violations.
Figure 4A:
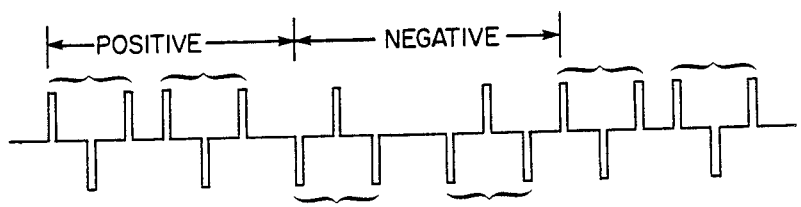
FIG. 4A is a T1 pulse stream having a sequence of positive and negative bi-polar violations, a test tone having a waveform produced as a result of filtering the fundamental frequency, the test tone frequency being $f_1$.
Figure 4A:
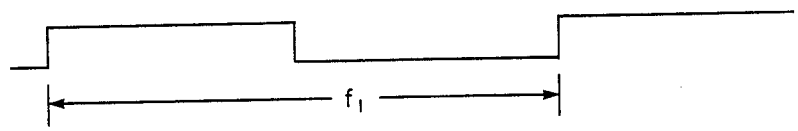
Figure 4B:
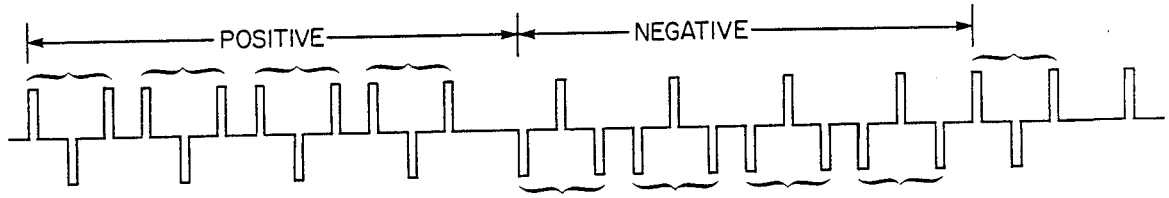
FIG. 4B is a T1 test pulse stream having a sequence of positive and negative bi-polar violations, a test tone having a waveform produced as a result of filtering the fundamental frequency, the test tone frequency being $f_3$.
Figure 4B:
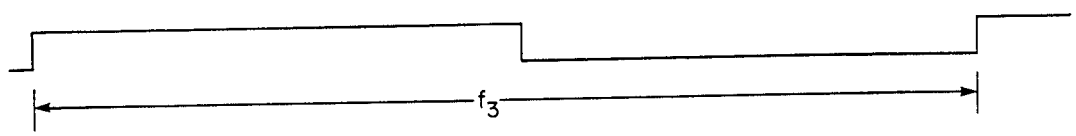

When testing the communications link that uses extended T1 superframes, the test set 24 will continuously send information on line 12a in an extended T1 superframe format until the test set 24 starts receiving information that it has transmitted. Referring to FIG. 3, embedded within the extended T1 superframe (N) is a sequence of framing bits $ESF_NFB_1$, $ESF_NFB_2$, ...$ESF_NFB_{23}$. The sequence of framing bits of the selected odd frames $ESF_1FB_3$, $ESF_1FB_7$,...$ESF_4FB_{19}$, $ESF_4FB_{23}$ forms a repeating twenty-four bit pattern. The first eight selected odd sequence of framing bits $ESF_1B_3$, $ESF_1B_7$, $ESF_2B_{11}$, $ESF_2B_{15}$ ...$ESF_2B_3$, $ESF_2B_7$ correspond to the preamble. The second eight even sequences of framing bits $ESF_2B_{11}$, $ESF_2B_{15}$ ...$ESF_3B_{11}$, $ESF_3B_{15}$ form the command word. The third eight even sequence of framing bits $ESF_3B_{19}$, $ESF_3B_{23}$...$ESF_4B_{19}$, $ESF_4B_{23}$ corresponds to a pre-stored eight bit reference pattern which equals the address of one of the repeaters (for example, 00000001 is shown in FIG. 1 for the address of repeater 16a). Referring to FIG. 5, the repeaters 16a–16n will detect the sequence of framing bits $ESF_1FB_3$, $ESF_1FB_7$,..$ESF_4FB_{19}$, $ESF_4FB_{23}$. Upon a repeater 16a detecting the even sequence of framing bits $ESF_1B_3$, $ESF_1B_7$,..$ESF_3B_{11}$, $ESF_3FB_{15}$ that matches its internal pre-stored eight bit reference pattern (00000001 shown in FIG. 1) and framing bits $ESF_1B_3$, $ESF_1B_7$...$ESF_3B_{11}$, $ESF_3B_{15}$ matching the preamble and set loop-back command word $(5AC3)_{16}$, the repeater 16a will set itself to a loop-back configuration.

After repeater 16a is set to a loop-back configuration, test set 24 sends information containing a test pattern to repeater 16a via transmit data line 12a. Repeater transmit buffer 30a then transmits the received information on line 12a through internal data line 36a into loop-back detector 34a onto internal data line 42a. Repeater transmit buffer 30a also transfers information from line 12a through internal data line 38a into repeater receive buffer 32a. The information in receive buffer 32a is then transmitted from internal data line 42a through repeater receive buffer 32a to receive data line 14a and back to test set 24.

Test set 24 then compares the test pattern it transmitted with the test pattern it received. If the pattern comparison indicates a match, then the following are known to be working: the repeater 16a, transmit data line 12a and receive data line 14a.

Once the repeater's 16a communications link has been tested, the test set 24 sends information along line 12a containing a second predetermined pattern or a reset pattern embedded within the sequence of framing bits $SF_1FB_1$, $SF_2FB_1$,... $SF_{24}FB_1$ for a normal superframe and framing bits $ESF_1B_3$, $ESF_1B_7$, ...$ESF_4B_{19}$, $ESF_4B_{23}$ for an extended superframe to repeater 16a. The reset pattern contains a preamble, command word and address as in the first predetermined pattern with the exception that the command word ($SF_9FB_1$, $SF_{10}FB_1$...$SF_{16}FB_1$ for a normal superframe and $ESF_2FB_{11}$, $ESF_2FB_{15}$...$ESF_3FB_{15}$ for an extended superframe) is equal to a different code (i.e. $C5_{16}$). Alternately, a unique address rather than a command could be transmitted by test set 24 to indicate a reset.

Repeater 16a receives this information containing a reset pattern $(5AC501)_{16}$. Loop-back detector 34a then scans the received information to detect the 8 bit sequence of framing bits ($SF_{17}FB_1$, $SF_{18}FB_1$,...$SF_{24}FB_1$ for a normal superframe and $ESF_3FB_{19}$, $ESF_3FB_{23}$,...$ESF_4FB_{23}$ for an extended superframe) which corresponds to the address of repeater 16a. Loop-back detector 34a also scans the received information to select the 16-bit sequence of framing bits, $SF_1FB_1$, $SF_2FB_1$,...$SF_{16}FB_1$ for a normal superframe and framing bits $ESF_1FB_3$, $ESF_1FB_7$...$ESF_3FB_{15}$ for an extended superframe, which correspond to the preamble and command word. The loop-back detector 34a then compares the received 8 bit sequence of framing bits against a second internally pre-stored eight bit reference pattern. If (1) the loop-back detector 34a detects a match between the 8 bit sequence of framing bits and the second pre-stored reset pattern $(01)_{16}$, (2) the received preamble equals the correct preamble $(5A)_{16}$; and (3) the received command word equals release loop-back command $(C5)_{16}$, loop-back detector 34a sets repeater 16a to a normal operating condition.

If the command word and preamble are not used, loop-back detector 34a scans the 8-bit sequence of framing bits ($SF_1FB_1$–$SF_1FB_8$ or $ESF_1FB_3$...$ESF_2FB_7$) for a second address to release loop-back such as alternating one's and zero's.

In a normal operating condition, information transmitted onto transmit data line 12a is not cross-connected onto receive data line 14a. Also, information on line 14b transmitted from remote terminal 18 is transmitted by repeater 16a to master terminal 10.

Test set 24 tests the T1 communications system by first testing repeater 16a in the manner previously described. Then test set 24 proceeds to test 16b–16n in the same manner as repeater 16a was tested.

Referring to FIG. 6, shown is an internal block diagram of T1 repeater 16a. The repeater 16a contains three sections; a repeater transmit buffer 30a, a loop-back detector 34a and a repeater receive buffer 32a. Repeater transmit buffer 30a is connected to both transmit data line 12a and transmit data line 12b.

Within repeater receive buffer 30a is circuitry to receive and retransmit information entering repeater 16a via internal transmit line 12a. Connected to transmit data line 12a are resistors 56a and 58a. The other end of resistors 56a and 58a are connected to a respective end of a transient suppressor 50a. Transient suppressor 50a as well as other transient suppressors 150a, 250a and 350a are used to prevent destruction of system components from lightning or other external high voltage sources that get coupled into repeater 16a. Also coupled to resistors 56a, 58a and transient suppressor 50a is isolation transformer 70a. Isolation transformers provide protection from current loops to repeater 16 by isolating the repeater 16a components from the rest of the system.

Coupled across the other side of isolation transformer 70a is the input to repeater transmit amplifier 300a. The output of repeater transmit amplifier 300a is connected to the primary winding of isolation transformer 170a. Isolation transformer 170a has two secondary windings 171a and 172a. Secondary winding 171a is connected to transient suppressor 150a and resistors 156a and 158a. One end of secondary winding 172a is connected directly to an input of loop-back detector 34a through internal data line 36a. The other end of secondary winding 172a is connected to repeater receive buffer 32a through internal data line 38a.

The output of loop-back detector 34a is connected to repeater receive buffer 32a through loop-back enable line 40a and internal data line 42a. Repeater receive buffer 32a is connected to receive data line 14b and to receive data line 14b.

Within repeater receive buffer 32a is circuitry to receive and retransmit information on line 14a entering repeater 16a on receive data line 14b. Connected to receive data line 14b are resistors 256a and 258a. Connected to the other end of resistors 256a and 258a is transient suppressor 250a. Also coupled to resistors 256a, 258a and transient suppressor 250a is isolation transformer 270a.

Coupled across the secondary side of isolation transformer 270a is position 1 of relay 90a. Position 2 of relay 90a is connected to internal data line 42a. Relay 90a contains a flip switch 94a which is activated by energizing and deenergizing transformer 82a. Flip switch 94a selects between position 1 and position 2 of relay 90a. Transformer 82a within relay 90a is connected at one end directly to loop-back detector 34a through loop-back enable line 40a. The other end of transformer 82a is ground. The output of relay 90a, is coupled through line 93 to the input of repeater receive amplifier 320a. The output of repeater receive amplifier 320a is connected to the primary winding of isolation transformer 370a. The secondary winding of isolation transformer 370a is connected to transient voltage suppressor 350a and resistors 356a and 358a. The other end of resistors 356a and 358a are connected to receive data line 14a.

During normal operation, master terminal 10 transmits information in a T1 format onto transmit data line 12a. The information on line 12 is received into the repeater 16a.

The information on transmit data line 12a enters repeater receive buffer 30a and crosses matching resistors 56a and 58a and is passed to isolation transformer 70a. Repeater transmit amplifier 300a receives the information from isolation transformer 70a. Amplifier 300a regenerates information from isolation transformer 70a and passes it to the primary winding of transformer 170a. The information on the secondary windings of transformer 170a are coupled to internal transmit line 52a, internal data line 36a and 38a. The information from transformer 170a is then sent onto transmit data line 12a through matching resistor 156a and 158a. The information from amplifier 300a is also sent to loop-back detector 34a through internal data line 36a and sent to repeater receive bufer 32a through internal data line 38a. Loop-back detector 34a continuously monitors information from amplifier 300a.

The information from remote terminal 18 enters the repeater 16a from receive data line 14b. The remote terminal information is sent across matching resistors 256a, 258a and transient suppressor 250a. Remote terminal information from line 14b, then crosses transformer 270a. Information from transformer 270a is then sent across relay 90a into repeater receive amplifier 320a via line 93. Repeater receive amplifier 320a then regenerates information from line 93. The information from repeater receive amplifier 320a is then sent to transformer 370a. The information then crosses transient voltage suppressor 350a and matching resistors 356a and 358a. The information from repeater receive amplifier 320a is then coupled onto receive data line 14a.

The repeater 16a is tested by being set to a loop-back condition by test set 24. Loop..back 34a will continuously monitor information on internal data line 36a. Loop-back detector 34a will determine if the proper sequence of 24 framing bits $SF_1FB_1$, $SF_2FB_1$...$SF_{24}FB_1$ (or framing bits $ESF_1FB_3$... $ESF_4FB_{23}$ for an extended superframe) matches a first pre-stored reference pattern $(5AC301)_{16}$. If the sequence of 24 framing bits matches the first pre-stored reference pattern, the loop-back detector 34a puts a positive voltage on loop-back enable line 40a. The loop-back detector 34a and its operation will be discussed later in connection with FIG. 7.

Once a positive voltage has been asserted on loop-back enable line 40a, a charge is then energized across the transformer 82a located within relay 90a. Relay 90a then sets flip switch 94a to position 2 which connects internal data line 42a to the repeater receive amplifier 320a. The internal data line 42a is always connected to the internal data line 36a within loop-back detector 34a. Once flip switch 94a in relay 90a has been flipped to position 2, repeater 16a is set to a loop-back condition. Information on line 12a is sent through repeater 16a and onto receive data line 14a.

To set repeater 16a to a normal operating condition, test set 24 continuously transmits information on line 12 containing an reset pattern. The reset pattern is disposed within a second sequence of framing bits, i.e. bits $SF_1FB_1$, $SF_2FB_1$,...$SF_{24}FB_1$ for a normal superframe and bits $ESF_1FB_3$, $ESF_1FB_7$,...$ESF_4FB_{23}$ for an extended superframe. The loop-back detector 34a continuously monitors the information on internal data line 36a. The loop-back detector 34a then determines if information on line 38a contains a reset pattern which matches a second prestored reference pattern (e.g. $5AC501_{16}$) pre-stored in ROM 112a (FIG. 7) and address switches 110a.

Upon the reset pattern matching the second prestored reference pattern, the loop-back detector 34a grounds the voltage potential on loop-back enable line 40a. Grounding loop-back enable line 40a de-energizes transformer 82a. Deenergizing transformer 82a changes the position of flip switch 94a to position 1. When flip switch 94a is in position 1, information across transformer 270a is coupled to repeater receive amplifier 320a. Changing flip switch 94a to position 1 causes information from the remote terminal 18 to be connected to the repeater receive amplifier 320a. Upon this connection being made, the repeater 16a will be in a normal operating condition.

Figure 7:
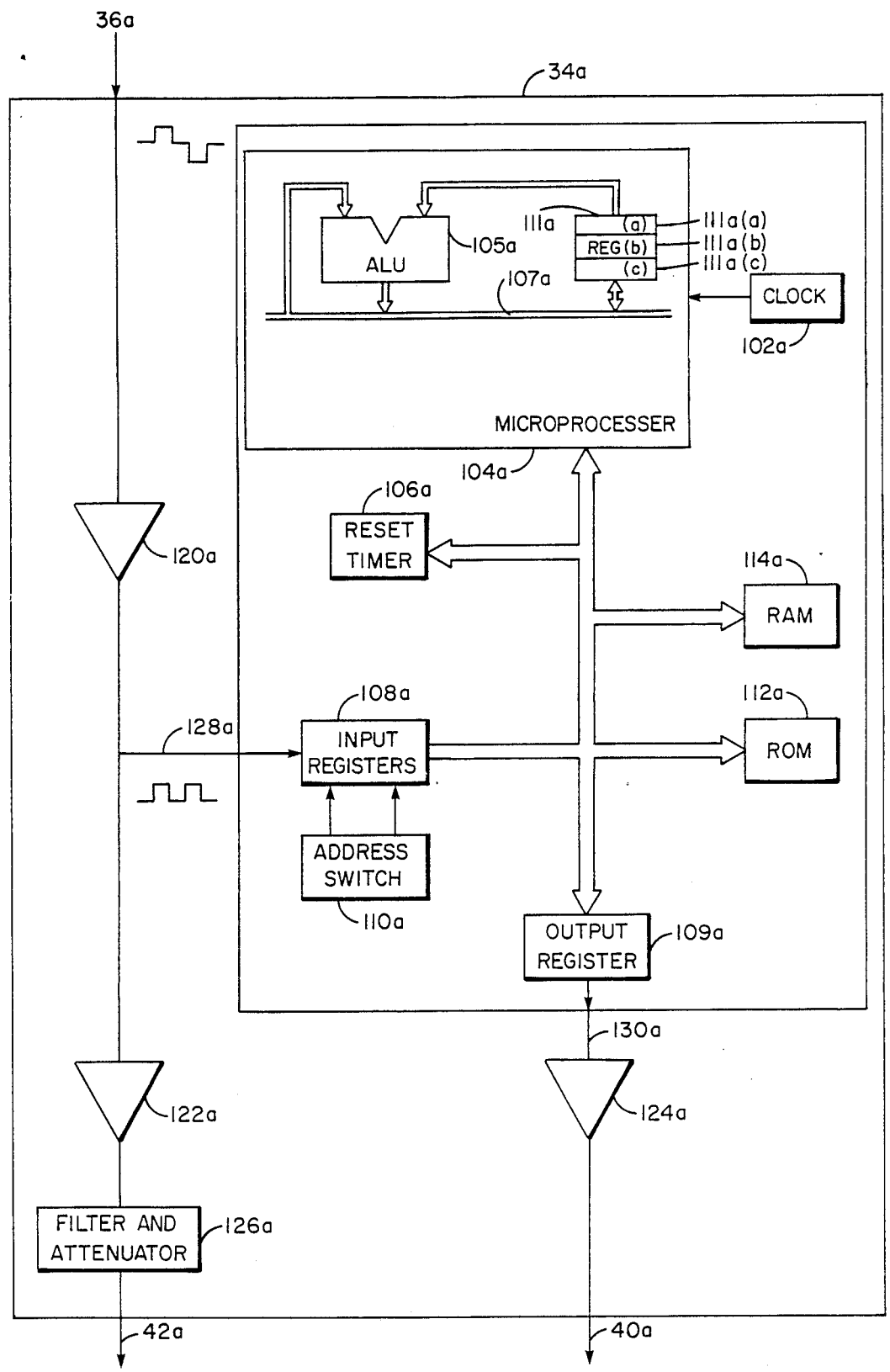
FIG. 7 is a block diagram of the loop-back detection circuitry with FIG. 6.

Referring to FIG. 7, shown is an internal block diagram of loop-back detector 34a. Loop-back detector 34a contains a clock 102a and reset timer 106a connected to a microprocessor 104a. Connected to microprocessor 104a through bus 116a is random access memory 114a, read only memory 112a, input register 108a and output register 109a. Input register 108a is connected to address switches 110a.

Microprocessor 104a contains an Arithmetic Logic Unit (ALU) 105a, I/0 Bus 107a and a register 111a. ALU 105a performs a comparison function within microprocessor 104a. I/0 Bus 107a provides a medium for the ALU 105a to transfer data to other functional elements (not shown) within microprocessor 104a. Register 111a is connected to ALU 105a and provides data storage within microprocessor 104a.

Clock 102a provides the synchronization for microprocessor 104a. Reset timer 106a provides the capability for microprocessor 104a to time out in the event of failure to detect a sync pattern. Read only memory or ROM 112a and random access memory or RAM 114a allow the repeater 16a to store an instruction set and data, respectively.

The Input register 108a is readable by the microprocessor 104a and provides a medium for microprocessor 104a to monitor information on line 36a in repeater 16a. The input register 108a coupled to address switch 110a which contains eight bits. Coupled to input register 108a through data line 128a is the output of buffer 120a and the input of buffer 122a.

Output register 109a is writable by microprocessor 104a. Output register 109a provides a medium for microprocessor 104a to control relay 90a. Coupled to output register 109a through line 130a is buffer 124a.

The input of buffer 120a is connected to internal data line 36a. The output of buffer 122a is connected to filter and attenuator 126a. The output of filter and attenuator 126a is coupled to internal data line 42a. The output of buffer 124a is connected to loop-back enable line 40a.

During normal operation, information on line 36a enters loop-back detector 34a from internal data line 36a. The information on line 36a then passes through buffer 120a onto data line 128a. The information on line 36a is then sent to the input register 108a and buffer 122a. The microprocessor 104a then monitors the information on line 128a to determine the start and end of a superframe by scanning information on line 128a and locating the sync pattern within the framing bits $SF_NFB_1$-$SF_NFB_{12}$ or $ESF_NFB_4$, $ESF_NFB_8$,..$ESF_NFB_{24}$.

When the repeater 16a is to be tested, the microprocessor 104a will monitor the framing bits $SF_1FB_1$, $SF_2FB_1$...$SF_{24}FB_1$ (or bits $ESF_1FB_3$, $ESF_1FB_7$,-..$ESF_4FB_{23}$ for an extended superframe) in information on line 128a with Input register 108a. If the preamble and command word match a pre-stored reference pattern $(5AC3)_{16}$, the microprocessor 104a compares the prestored eight bit reference pattern $RP_1$-$RP_8$ set within address switches 110a with the receive<sequence of framing bits $SF_{17}FB_1$, $SF_{18}FB_1$...$SF_{24}FB_1$ (or bits $ESF_3FB_{19}$, $ESF_3FB_{23}$,... $ESF_4FB_{23}$ for an extended superframe) which corresponds to the repeater 16a address.

Microprocessor 104a performs the comparing instruction by first reading the preamble and comand from ROM 112a ($RP_1$-$RP_{16}$), reading the reference pattern $RP_{17}$-$RP_{24}$ represented by address switch 110a through input register 108a and then storing that information ($RP_1$-$RP_{24}$) into register 111a(a). Second microprocessor reads the 24 bits of the received framing bit pattern ($RFP_1$-$RFP_{24}24$) on line 128a via input register 108a and stores the information in RAM 114a. Third, the microprocessor 104a performs a compare function by accessing the data in RAM 114a corresponding to the sequence of received framing bit ($RFP_1$-$RFP_{24}$). Fourth, the microprocessor 104a then uses its internal Arithmatic Logic Unit (ALU) 105a to compare data accessed from RAM 114a (framing bits $SF_1FB_1$, $SF_2FB_1$...$SF_{24}FB_1$ or bits $ESF_1FB_3$, $ESF_1FB_7$,...$ESF_4FB_{23}$) with the data in register 111a(a) (i.e. reference pattern $RP_1$-$RP_{24}$) and stores the result in register 111a(c). The details of the microprocessor programming operation will be explained later.

A compare bit will be set in register 111a(c) if microprocessor 104a determines that the pre-stored twenty-four bit reference pattern ($RP_1$-$RP_{24}$) within input register 108a matches the received first 24 framing bits $SF_1FB_1$, $SF_2FB_1$...$SF_{24}FB_1$ or bits $ESF_1FB_3$, $ESF_1FB_7$,...$ESF_4FB_{23}$ stored in RAM. Fifth, the microprocessor then reads the comparison bit in register 111a(c). If the comparison bit is set, repeater 16 is then set to a loopback condition. Microprocessor 104a performs this function by writing a bit to output register 109a which causes a positive voltage to be inserted onto line 130a and into buffer 124a. The output of buffer 124a then asserts a positive voltage on line 40a.

Referring to FIG. 6, line 40a is coupled to transformer 82a. A positive voltage is then asserted across transformer 82a, which results in a flip switch 94a located within relay 90a being flipped to position 2. Flipping switch 94a to position 2 couples information on transmit data line 12a to repeater receive amplifier 32a and disconnects information on receive data line 14b from repeater receive amplifier 32a.

Referring to FIG. 7, while in loop-back condition, information on internal data line 36a is transmitted through buffer 120a. This information on line 128a is then sent through buffer 122a to filter (772 KHz Band Pass Filter) and attenuator 126a. This filter 126a prevents characteristic destruction of signals and removes any excess noise embedded within the information on line 128a. The attenuation of signals on line 128a prevents overdrive of amplifier 320a. Referring to FIG. 6, the information from filter 122a is then sent through internal data line 42a, through relay 90a, onto repeater receive buffer 32a and then back to master terminal 10.

Referring to FIG. 7, while in loop-back condition, the microprocessor 104a continuously monitors, via input register 108a, information on data line 128a to detect if a second address or reset pattern has been transmitted. Microprocessor 104a detects the reset pattern by using ALU 105a to compare the reset pattern against a second pre-stored eight bit reference pattern burned into ROM 112A and the reference pattern $RP_{17}$-$RP_{24}$ represented by address switch 110a. This second sequence of 24 framing bits $SF_1FB_1$, $SF_2FB_1$...$SF_{24}FB_1$ or bits $ESF_1FB_3$, $ESF_1FB_7$,...$ESF_4FB_{23}$ pattern to release loop-back is typically $(5AC501)_{16}$.

Once the microprocessor 104a determines that the information on line 128a containing a reset pattern has been transmitted, the microprocessor 104a writes a zero bit to output register 109a. The zero bit written into output register 109a asserts a low voltage onto line 130a. A low voltage on line 130a asserts a low voltage onto loop-back enable line 40a. Referring to FIG. 6, a low voltage on loop-back enable line 40a sets switch 94a to position 1 and uncouples internal data line 42a from line 93. Information that now enters on receive data line 14b is then sent to repeater receive amplifier 32a and onto master terminal 10.

Figure 8:
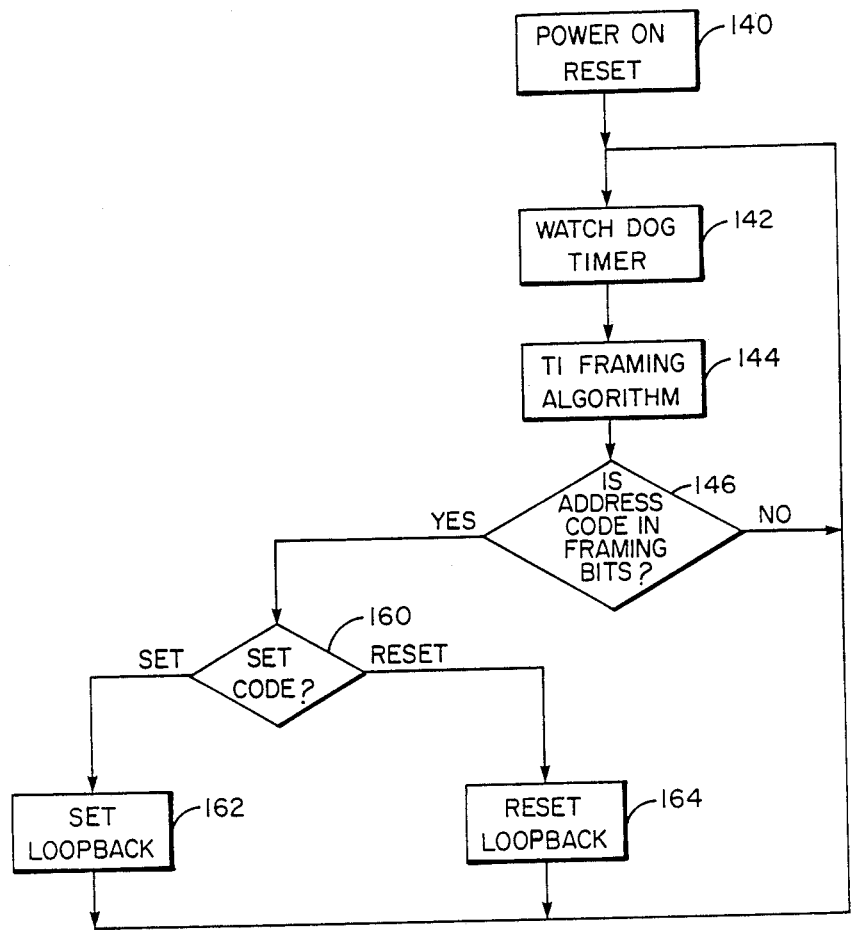
FIG. 8 is a flow chart of the loop-back detection software.

Referring to FIG. 8, shown is the algorithm used to set repeater 16a to both a loop-back condition and a normal condition. The first step in the algorithm is power-on-reset 140. Power-on-reset 140 sets the repeater to a normal condition. Power-on-reset 140 runs diagnostics routines, resets all memory, and reads all pre-stored reference patterns located within address switches 110a and ROM 112A. These respective reference patterns are stored in register 111a. A bit set in address switch 110a indicates to microprocessor 104a if the T1 frames are in a standard or extended format. After power-on-reset 140 repeater 16a is set to the normal operating condition.

The second step in the algorithm is watchdog timer 142. The watch dog timer 142 provides a regular software reset to the external timer 106a. If the microprocessor 104a stops running its program due to a fault (e.g. power transient), the watch dog timer section of the program will never execute, a software reset is not generated, and the external hardware timer resets the microprocessor 104a to a power on reset. This time period for loss of program before a time out occurs is 5 minutes. Once a software reset occurs, the microprocessor 104a will execute step 144.

The next step in the algorithm is a T1 framing algorithm 144. This T1 framing algorithm 144 determines where the T1 frame begins and ends by having the microprocessor 104a read input register 108a to detect the sync pattern within the sequence of framing bits $FB_1$-$FB_{12}$ or $EFB_2$, $EFB_4$...$EFB_{24}$ by sampling every 193 bit. All other bits are stored in RAM 114a. Upon the T1 framing algorithm 144 determining the end and beginning of the frame, the microprocessor 104a reads via input register 108a framing bits in successive superframes $SF_1FB_1$, $SF_2FB_2$...$SF_{24}FB_{24}$ or $ESF_1FB_3$, $ESF_1FB_7$,...$ESF_4FB_{23}$, and stores those framing bits into RAM 114a. After each bit is stored, the processor will execute step 146.

In Step 146, the microprocessor 104a interrogates the sequence of framing bits $RFP_1$-$RFP_{24}$ stored in RAM. Microprocessor 104a then determines if the sequence of framing bits $SF_1 FB_1$, $SF_2FB_2$...$SF_{24} FB_{24}$ or $ESF_1FB_3$, $ESF_1FB_7$...$ESF_4 FB_{23}$ stored in RAM form a reference pattern that contains a command word that indicates set loop-back configuration and matches $RP_1$-$RP_{24}$, or a reset pattern that matches the corresponding reset pattern in ROM 112a (i.e. $RP_1$-$RP_{24}$ with a command word that indicates release loop-back configuration). The comparison is done by ALU 105a within microprocessor 104a as previously described in connection with FIG. 7. If a match is not detected, the microprocessor 104a executes timer step 142. If a sequence of framing bits has been received, that matches the address stored in address switches 110a or reset pattern stored in ROM 112a ($R_1$-$R_8$), the microprocessor 104a executes step 160.

Step 160 checks the sequence of framing bits stored in RAM 114a to determine if the command word is a set loop-back code or release loop-back code. If the address code (RFP$_8$–RFP$_{16}$) is a set code (C3)$_{16}$, the microprocessor 104a will proceed to process set loop-back step 162. If the command word (RFP$_3$–RFP$_{10}$) is a reset code (CS)$_{16}$ the microprocessor 104a executes the reset loop-back step 164.

In set loop-back step 162, microprocessor 104a causes the loop-back condition to occur. This occurs by the microprocessor 104a writing a one bit to output register 109a. By writing to output register 109a, a positive voltage will be sent across transformer 82a causing switch 94a within relay 90a to move to position 2 to establish a loop-back condition. Following set loop-back step 162, the microprocessor 104a now continues by executing timer step 142.

Reset loop-back step 164 clears the previously set loop-back condition by writing a zero to output register 109a. Writing a zero into output register 109a causes a voltage differential of zero to be placed across transformer 82a. This causes switch 94a within relay 90a to be set to position 1 and establishes a normal operating condition. After setting switch 94a to position 1, the microprocessor 104a now executes timer step 142.

This concludes the Description of the Preferred Embodiments. A reading by those skilled in the art will bring to mind many modifications and alternatives without departing from the spirit and scope of the invention. Accordingly, it is intended that the invention only be limited by the following claims.

What is claimed is:

1. A communications system having a master terminal, a remote terminal, and at least one remote repeater, the master terminal transmitting along a transmit data path information serially through said repeater to said remote terminal and receiving along a receive data path information serially through said repeater from said remote terminal, such information comprising a plurality of successive frames, each frame having a framing bit, the communication system comprising:
    means disposed within said remote repeater, coupled to said transmit data path for receiving a plurality of said framing bits;
    means, disposed within said remote repeater, for transferring information from said master terminal transmitted on said transmit data path back to said master terminal on said receive data path when said received plurality of framing bits has a predetermined pattern relative to a prestored reference pattern.

2. The communications system as recited in claim 1 further comprising:
    means disposed within said master terminal and coupled to said transmit path for transmitting a plurality of test information to said remote repeater transmitting said test information back to said master terminal via the receive data path.

3. A communication system having a master terminal, a remote terminal, and at least one remote repeater, the master terminal transmitting along a transmit data path information serially through said repeater to said remote terminal and receiving along a receive data path information serially through said repeater from said remote terminal, such information comprising a plurality of successive frames, each frame having a framing bit, the communication system comprising:
    means disposed within said remote repeater and coupled to said transmit data path for receiving a plurality of said framing bits, said plurality of framing bits produce a predetermined sequence;
    means, disposed within said remote repeater, for comparing said predetermined sequence of framing bits to a stored reference pattern and for producing a control signal when said reference pattern and said plurality of framing bits that produce a predetermined sequence have a predetermined relation with the other; and
    means disposed within said repeater and responsive to said control signal for transferring information, transmitted on said transmit data path from said master terminal, back on said receive data path to said master terminal.

4. The communication system as recited in claim 3 further comprising:
    means disposed within said master terminal and coupled to said transmit data path for transmitting along said transmit data path said plurality of framing bits that produce said predetermined sequence along said transmit data path to said remote terminal; and
    means disposed within said master terminal and coupled to said transmit path for transmitting a plurality of test information to said remote repeater, said repeater transmitting said test information back to said master terminal via the receive data path.

5. The communication system as recited in claim 4 further comprising:
    means disposed within said master terminal, for receiving said test information along said receive data path transmitted by said test information transmitting means to isolate faults along said transmit and receive data paths.

6. A digital carrier communication system having a master terminal, remote terminal, and at least one serially coupled remote repeater, said master terminal being adapted to transmit along a transmit data path through said repeater to said remote terminal and receive along a receive data path through said repeater from said remote terminal time multiplexed information in a T1 digital bit stream format, the format of the T1 digital bit stream comprising a plurality of frames, each frame comprising a plurality of time slots and one framing bit, such system comprising:
    means disposed within said repeater and coupled to said transmit path for receiving a plurality of said framing bits;
    means disposed within said repeater for producing a control signal when said plurality of framing bits bears a predetermined relationship to a reference pattern stored within said repeater; and
    means disposed within said repeater and responsive to said control signal for transferring information transmitted on said transmit data path from said master terminal back to said master terminal on said receive data path.

7. The digital carrier communications system recited in claim 6 wherein said master terminal further comprises:
    means for transmitting said plurality of framing bits in a T1 format along said transmit path serially to said repeater when said plurality of framing bits bear a predetermined relationship to said reference pattern;
    means coupled to said transmit path for transmitting a plurality of test information in a T1 data format to said repeater, said repeater transmitting said test signal back to said master terminal via the receive data path.

8. The digital carrier communications system as recited in claim 5 wherein said master terminal comprises:
means for receiving said test information, transmitted by said test information transmitting means along said receive path to isolate system faults.

9. The method of testing a communications link having respectively separated uni-directional data paths, to localize the section of said link having transmission problems, said communications link comprising a master terminal, a remote terminal and at least one remote repeater, the master terminal transmitting along a transmit data path information serially through said repeater to said remote terminal and receiving along a receive data path information serially through said repeater from said remote terminal, comprising the steps of:
transmitting, by said master terminal along said transmit path, a plurality of data frames serially to said repeater, said data frame comprises a framing bit and a plurality of data channels, a plurality of said framing bits produce a predetermined sequence;
receiving said predetermined sequence of framing bits by said remote repeater along said transmit path;
comparing said received predetermined sequence of framing bits to a stored reference pattern;
producing a control signal by said remote repeater when said stored reference pattern and said predetermined sequence of framing bits have a predetermined relation with the other; and
transmitting by said remote repeater all signals transmitted along said transmit path to said remote repeater from said master terminal, back to said master terminal via the receive data path in response to the produced control signal.

10. The method of testing a communication link as recited in claim 9 further comprising the steps of:
transmitting test information by said master terminal along said transmit path to said remote repeater;
receiving along said transmit data path by said remote repeater said test information transmitted along said transmit path by said master terminal;
transmitting along said receive path said test information received by said remote terminal to said master terminal;
receiving along said receive path said test information transmitted by said remote repeater to said master terminal;
comparing said received test information by said master terminal with said test information transmitted by said master terminal to isolate faults along said communications link;
transmitting a second predetermined sequence of framing bits from said master terminal along said transmit path to said remote repeater;
receiving said second predetermined sequence of framing bits by a means disposed within said remote repeater coupled to said transmit data path;
comparing said received second predetermined sequence of framing bits to a predetermined reference pattern;
producing a second control signal when said reference pattern and said second predetermined sequence of framing bits have predetermined relation with the other; and
transmitting by said remote repeater to said master terminal all information transmitted to the remote terminal from said remote terminal, in response to said second produced control signal.

11. The method of testing a communications link as recited in claim 9 comprising the additional step of:
transmitting all data frames by said master terminal in a time multiplexed T1 digital bit stream.

12. The method of testing a communication link as having respectively separated uni-directional transmit and receive paths, to localize communications link comprising a master terminal communicating to a remote terminal through one or more serial coupled remote repeaters interposed in and between said paths, comprising the steps of:
transmitting by said master terminal a plurality of superframes of data in a T1 format serially to the remote terminal along said transmit path, said superframes of data comprise a plurality of data frames, said data frame comprises a plurality of data channels and a framing bit, said framing bits disposed within said superframes of data combine to form a plurality of sync bits and a predetermined sequence;
detecting said predetermined sequence of framing bits by said receiver section disposed within said remote repeater;
changing said remote repeater to a loopback condition in response to said predetermined sequence of framing bits bearing a predetermined relationship to a reference pattern stored within said remote repeater;
transmitting a test information from said master terminal along said transmit path through said link to said remote repeater and back to said master terminal along said receive path to verify said communications link is operational;
transmitting a second plurality of superframes of data in a T1 format from said master terminal through said remote repeater along said transmit path, said second plurality of superframes of data contains a predetermined sequence of framing bits;
detecting said predetermined sequence of framing bits by said receiver section disposed within said remote repeater; and
charging said remote repeater to a reset condition in response to said predetermined sequence of framing bits bearing a predetermined relationship to a reference pattern stored within said remote repeater.

13. A repeater station apparatus for use in a transmission system passing time multiplexed information, the apparatus comprising:
first and second regenerators for receiving and transmitting time multiplexed information on respectively separate unidirectional paths of the system, said information having a plurality of frames, each frame having a framing bit;
means responsive to said time multiplexed information for comparing a plurality of said framing bits of said time multiplexed information received on one of said unidirectional paths with a predetermined stored reference pattern and for generating a control signal in accordance with such comparison; and
means responsive to said control signal for transferring information on said one unidirectional path onto the other unidirectional path of the system.

14. A repeater station apparatus for use in a digital transmission system passing time multiplexed information, comprising a plurality of successive superframes, each superframe having a plurality of frames, each frame having a framing bit, the plurality of said framing bits producing said address, the apparatus comprising:

two digital regenerators for respectively separate unidirection paths of the system;

means for comparing the address portion of said time multiplexed information sent along one of the unidirectional paths with a predetermined stored reference pattern and for generating a control signal in accordance with such comparison; and means responsive to said control signal for enabling a loopback condition between the unidirectional paths of the system.

15. The apparatus as recited in claim 14 wherein said time multiplexed information is sent in a T1 format.

16. The apparatus as recited in claim 15 wherein a combination of said framing bits disposed within said time multiplexed information produces a plurality of sync bits.

17. A repeater station apparatus for use in a digital transmission system passing time multiplexed information, where a combination of even framing bits disposed within said time multiplexed information produces a plurality of sync bits and a combination of odd framing bits disposed within said time multiplexed information produces said address, the apparatus comprising:

two digital regenerators for respectively separate unidirection paths of the system;

means for comparing the address portion of said time multiplexed information sent along one of the unidirectional paths with a predetermined stored reference pattern and for generating a control signal in accordance with such comparison; and means responsive to said control signal for enabling a loopback condition between the unidirectional paths of the system.

18. The apparatus as recited in claim 14 wherein said framing bits that produce said address occur in predetermined framing bit locations of successive superframes.

19. The apparatus as recited in claim 13 comprising means for comparing a control pattern of said time multiplexed information with said predetermined stored reference pattern and for generating said control signal in accordance with such comparison.

20. A repeater station comprising:

means for receiving multiplex information from a source for retransmission, said information having a plurality of sequential frames, each having a framing bit; and means responsive to a predetermined bit pattern of said received framing bits for transmitting received multiplex information back to said source.

* * * * *